April 10, 1951 R. LEWTON 2,548,167
SHOCK ABSORBER MOUNTING
Filed Nov. 1, 1946 2 Sheets-Sheet 2
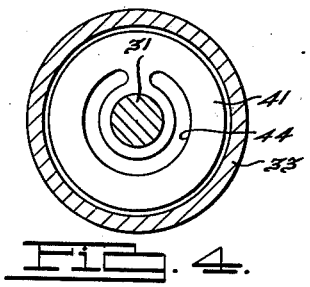
FIG. 4.
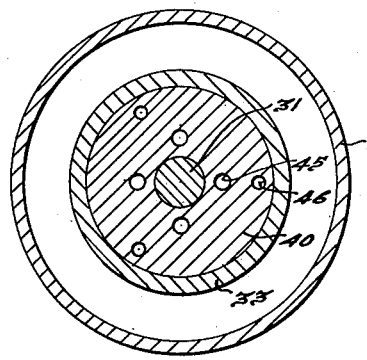
FIG. 5.
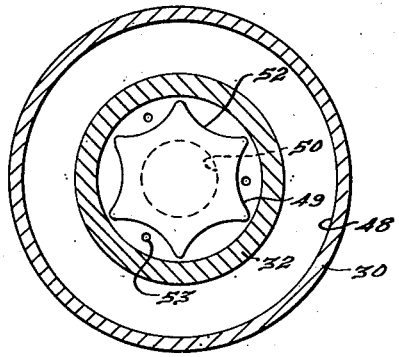
FIG. 6.
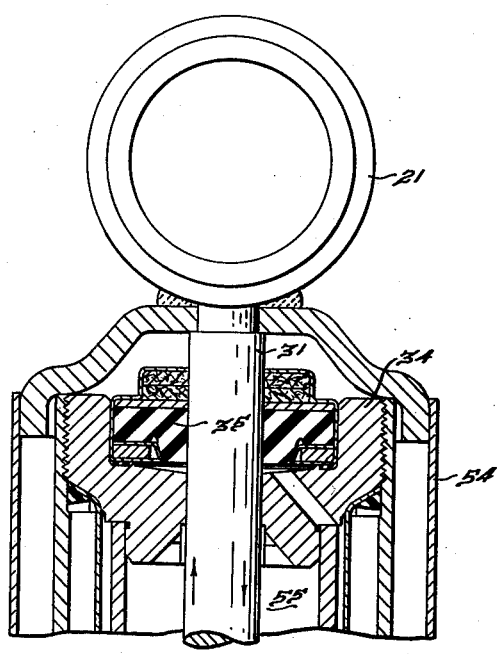
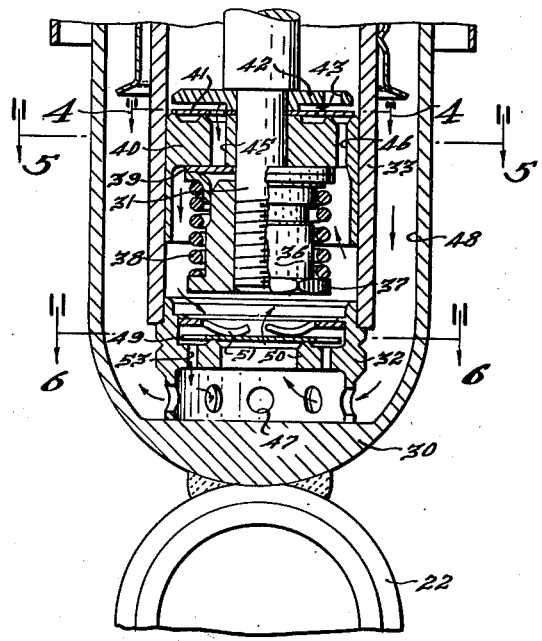
FIG. 3.
INVENTOR
Ross Lewton.
BY
Harness and Harris
ATTORNEYS Patented Apr. 10, 1951

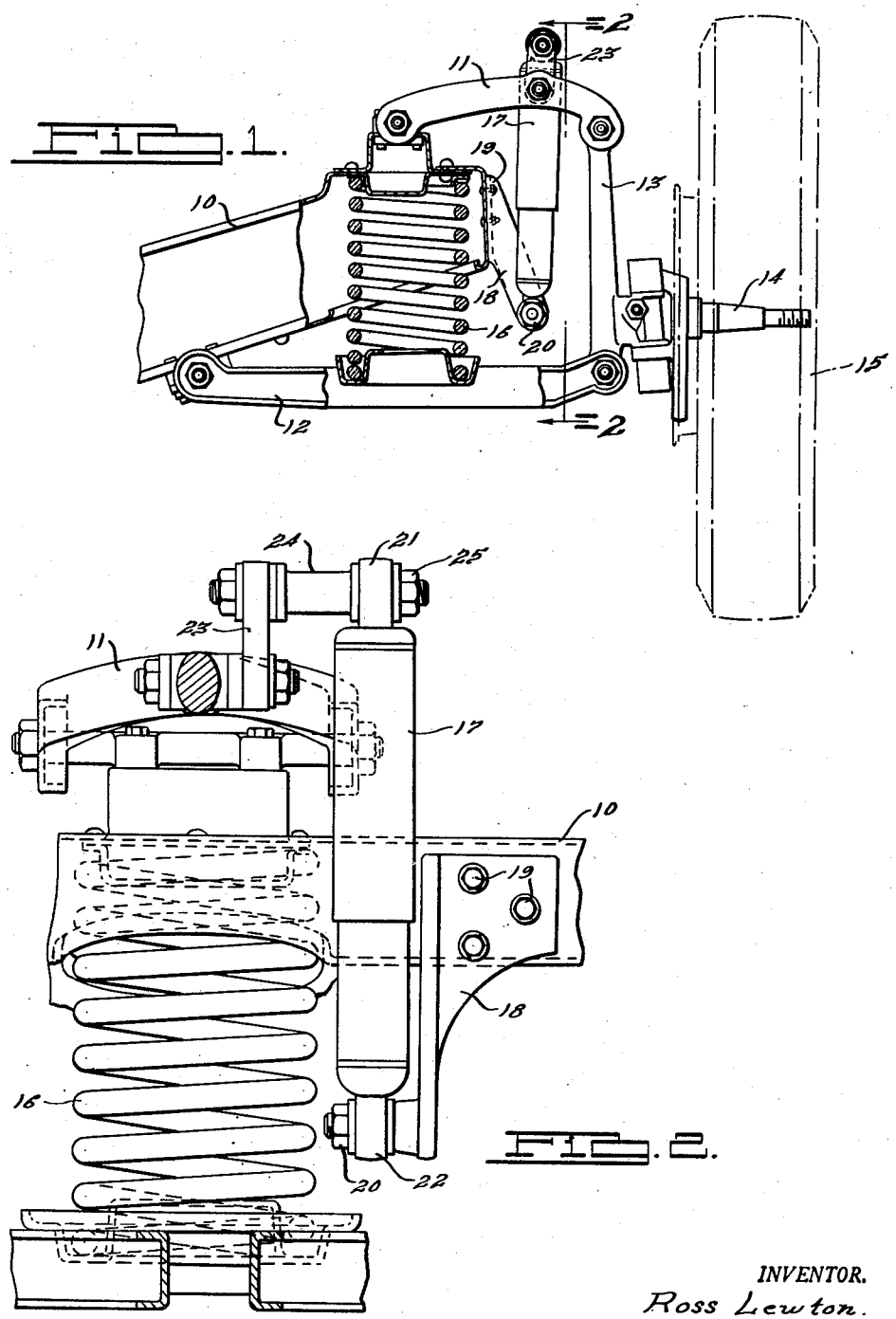

2,548,167

UNITED STATES PATENT OFFICE 2,548,167

SHOCK ABSORBER MOUNTING

Ross Lewton, Highland Park, Mich., assignor to Chrysler Corporation, Highland Park, Mich., a corporation of Delaware Application November 1, 1946, Serial No. 707,229

3 Claims. (Cl. 267—8)

This invention relates to shock absorbers for motor vehicles and more particularly to mountings for telescopic hydraulic shock absorbers relative to the sprung and unsprung portions of motor vehicles.

The invention herein will be described with reference to the front suspension of a motor vehicle although it is to be understood that similar principles are involved in the rear suspension and that the invention is applicable to rear suspension systems.

Heretofore it has been customary to connect the lower end of a telescopic hydraulic shock absorber to the lower control arm or the lower portion of the steering knuckle support of an independent wheel suspension assembly. The upper portion of the shock absorber has been sometimes connected to the frame of the motor vehicle and sometimes to the upper control arm of the independent suspension assembly. These mountings of the shock absorber have been found to have at least two serious disadvantages.

The first disadvantage is that the reservoir containing the major portion of the oil used in the shock absorber is subjected to the operating movements and vibrations of the lower control arm. This repeated agitation induces a frothing and aeration of the oil. The oil becomes foamy and the cushion effect of the shock absorber is lost under these conditions. Permitting the vehicle to stand idle for an interval of time will restore the oil to its former effectiveness, but continued operation under extremely bumpy conditions will cause a radical drop in the efficiency of the shock absorber. This is sometimes loosely referred to as a "cocktail shaker effect." It is an object of the invention to connect the reservoir of oil to the vehicle frame or sprung portion which is relatively stationary, and to thereby minimize the frothing of the oil.

The second disadvantage of these shock absorber mountings is that the most effective travel of the shock absorber is not utilized to cushion the upward movement of the unsprung portion of the vehicle. When the vehicle wheel strikes a bump and rises, the conventional shock absorber mounting causes the shock absorber to shorten. For reasons to be described herein this is not the most effective cushioning movement of the shock absorber. It is an object of my invention to cause the shock absorber to lengthen under these conditions and thereby use it to its best advantage.

Referring to the drawings:

Fig. 1 is a front elevation of the independent suspension assembly of a vehicle embodying my invention;

Fig. 2 is an elevation taken on the line 2—2 of Fig. 1;

Fig. 3 is a vertical section of a shock absorber;

Fig. 4 is a section taken on the line 4—4 of Fig. 3;

Fig. 5 is a section taken on the line 5—5 of Fig. 3; and

Fig. 6 is a section taken on the line 6—6 of Fig. 3.

In Fig. 1 the front cross member 10 of the vehicle frame is illustrated as having an upper control arm 11 and a lower control arm 12 pivotally mounted thereon. A steering knuckle support 13 has its end portions pivotally connected to the upper and lower control arms respectively. A steering knuckle 14 is rotatably mounted on the steering knuckle support in the usual manner. The steering knuckle support 14 is adapted to carry a wheel 15. A coil spring 16 is positioned with its axis in substantially a vertical plane and the lower end of this spring is supported by the lower control arm 12. The upper end of the coil spring 16 supports the frame cross member 10 in the usual manner. A telescopic hydraulic shock absorber 17 of a type commonly used in the automotive industry, is supported in a substantially vertical position. A depending bracket 18 is secured to the frame by bolts 19. The lower portion of the bracket 18 is provided with a substantially horizontal shaft, on which the lower end of the shock absorber is rotatably mounted and retained by the nut 20. The upper and lower ends of the shock absorber are provided with rings 21 and 22. Ring 22 is concentric with the shaft of bracket 18. The upper control arm 11 has a bracket 23 and shaft 24 rigidly secured thereto. The upper ring of the shock absorber 17 is rotatably mounted on the shaft 24 and secured thereon by the nut 25.

In operation when the wheel 15 strikes a bump it moves upward and through the steering knuckle support rotates the upper control arm 11 and lower control arm 12 in a counterclockwise direction thus elongating the shock absorber 17 and compressing the coil spring 16. Downward motion of the wheel 15 under the influence of the spring 16 will reverse the direction of motion of the upper and lower control arms, the spring, and the shock absorber.

In Figs. 3, 4, 5, and 6 a conventional type of telescopic hydraulic shock absorber is illustrated. The construction of this shock absorber is conventional, but its operation must be understood to realize the advantages inherent in my novel mounting. The lower ring 22 is welded to a reservoir tube 30. The upper ring 21 is rigidly secured to a piston rod 31. A port member 32 is rigidly secured to the lower internal portion of the reservoir tube 30 and supports a cylinder tube 33. The upper portion of the reservoir tube is closed by the threaded element 34 which receives the upper end of the cylinder tube 33. A piston rod 31 penetrates the threaded element 34 and is adapted for axial reciprocation relative thereto. Suitable packing 35 is provided in the threaded element 34 around the piston rod 31. A piston rod nut 36 is provided with a lateral flange 37 which supports a coil spring 38. A valve plate 39 is concentric with the piston rod 31 and urged upwardly in Fig. 3. A piston 40 is secured to the piston rod 31. A plate valve 41 is positioned above the piston and retained in position by a piston washer 42. The piston washer 42 is provided with orifices 43 and preferably does not have a diameter sufficiently large for it to seal the cylinder tube 33. The plate valve 41 has a circular opening 44 therein which is illustrated in Fig. 4. The piston is provided with relatively large orifices 45 which are aligned with the opening 44. The plate valve 39 is adapted to seal the orifice 45 against any upward movement of oil through the piston and to resist downward movement of oil through the piston by compression of the spring 38. Piston 40 is provided with additional orifices 46 which are not aligned with the circular opening 44 of the plate valve 41 so that the plate valve 41 is able to seal the orifices 46 against the downward movement of oil through the piston in these orifices. The plate valve 41 is relatively weak and will permit the upward movement of oil through the piston orifices 46. Port member 32 is provided with a plurality of ports 47 which are connected with an oil reservoir 48 formed in the space between the reservoir tube 30 and the cylinder tube 33. The port member 32 has a substantially hollow interior to which the ports 47 lead. A star-shaped plate valve 49 is seated above an orifice 50 provided in the internal portion of the port member 32. A spring 51 holds the star-shaped valve 49 in position sealing the orifice 50 against the downward movement of oil through orifice 50. The springs 51 are relatively weak and permit the upward movement of oil through the orifice 50. The star-shaped plate 49 is provided with a plurality of recessed peripheral portions 52. Supplemental orifices 53 are provided in parallel relationship with the orifice 50. The orifices 53 are located relative to the star-shaped plate valve 49 so that oil which passes the recessed portions 52 of the plate valve is free to enter the orifices 53. A conventional dust shield 54 is secured to the piston rod 31 and disposed in concentric relationship with the reservoir tube. The space between the piston washer 42 and threaded element 34 forms an operating chamber 55.

In operation when the piston rod 31 is extended relative to the reservoir tube 30, the piston 40 and piston washer 42 are moved upward and this motion is resisted by oil in the chamber 55. The oil in the chamber 55 retards the movement of the piston 40 by a dashpot action which permits limited displacement of the oil through the piston 40. The displaced oil passes downward through the orifice 43 and continues downward through the slot 44 in plate valve 41 and enters the orifices 45 in the piston. The force imparting such motion to the oil must be of sufficient magnitude so that the oil pressure against valve 39 will overcome the spring 38 and permit oil to leave the orifice 45 and pass downward over the piston rod nut 36. Thus the upward movement of the piston relative to the reservoir tube is permitted but restricted. The upward movement of the piston rod relative to the reservoir tube draws oil from the reservoir 48 through the ports 47, the large orifices 50 and unseats the valve 49. Some oil also passes through the orifice 53. The reverse movement of the piston rod in a downward direction forces oil upward through the orifices 46 and unseats the plate valve 41 thereby filling the chamber 55. The restriction to the motion of the piston is greatest when the piston is attempting to move upward relative to the reservoir tube, for the discharge of oil is resisted by the spring 38 which is of relatively great strength compared to the plate valves in the system.

The mounting of the shock absorber with the lower end secured to the relatively stationary sprung portion of the vehicle minimizes the shaking and foaming of the oil in the reservoir.

The shock absorber is used to its best advantage where its elongation resists rising movement of the wheel and its relatively unresisted compression accompanies the downward return movement of the wheel under the influence of spring 16.

I claim:

1. In a motor vehicle having a frame and an independent wheel suspension assembly, an upper control arm pivotally mounted at one end thereof on said frame, a lower control arm pivotally mounted at one end thereof on said frame, a coil spring positioned between said frame and an intermediate portion of said lower control arm, means supporting a wheel from the free ends of said upper and lower control arms, a bracket extending laterally of said frame between said spring and said wheel, and a vertical hydraulic shock absorber having a fluid reservoir element and a piston, said reservoir element being spaced laterally of said frame and mounted on said bracket at a location between said spring and said wheel and said piston being operatively connected with an intermediate portion of said upper control arm.

2. In a motor vehicle having a frame and an independent wheel suspension assembly, an upper control arm pivotally mounted at one end thereof on said frame, a lower control arm pivotally mounted at one end thereof on said frame, a coil spring positioned between said frame and an intermediate portion of said lower control arm, means supporting a wheel from the free ends of said upper and lower control arms, a bracket depending from said frame and having an end portion located between said spring and said means and at a higher elevation than the pivotal mounting of said lower control arm and a vertical hydraulic shock absorber having a fluid reservoir element and a piston, said reservoir element being mounted on said bracket end between said spring and said means and said piston being operatively connected with an intermediate portion of said upper control arm.

3. In a motor vehicle having a frame and an independent wheel suspension assembly, an upper control arm pivotally mounted at one end thereof on said frame, a lower control arm pivotally mounted at one end thereof on said frame and spaced vertically from said upper control arm, a coil spring positioned between said frame and an intermediate portion of said lower control arm, means supporting a wheel from the free ends of said upper and lower control arms, a depending bracket extending laterally of said frame and having a shock absorber mounting portion located between said vertically spaced upper and lower control arms and located laterally between said spring and said wheel and a vertical hydraulic shock absorber having a fluid reservoir element and a piston, said reservoir element being mounted on said bracket mounting portion between said control arms and between said spring and said wheel and said piston being operatively connected with an intermediate portion of said upper control arm.

ROSS LEWTON.

REFERENCES CITED

The following references are of record in the file of this patent:

UNITED STATES PATENTS

| Number | Name | Date |
|---|---|---|
| 2,138,513 | Rossman et al. | Nov. 29, 1938 |
| 2,188,909 | Leighton | Feb. 6, 1940 |
| 2,188,952 | Leighton | Feb. 6, 1940 |
| 2,189,651 | Leighton | Feb. 6, 1940 |
| 2,260,634 | Mullner | Oct. 28, 1941 |
| 2,342,381 | Thornhill | Feb. 22, 1944 |

FOREIGN PATENTS

| Number | Country | Date |
|---|---|---|
| 817,816 | France | May 31, 1937 |